(12) United States Patent
Nakamura et al.

(10) Patent No.: US 10,539,189 B2
(45) Date of Patent: Jan. 21, 2020

(54) PROTECTIVE COVER HAVING SENSOR HOLDER PART, BEARING DEVICE INCLUDING THE PROTECTIVE COVER, AND METHOD FOR MANUFACTURING THE PROTECTIVE COVER HAVING THE SENSOR HOLDER PART

(71) Applicant: NAKANISHI METAL WORKS CO., LTD., Osaka-shi (JP)

(72) Inventors: Masayoshi Nakamura, Osaka (JP); Yutaka Jogan, Osaka (JP)

(73) Assignee: NAKANISHI METAL WORKS CO., LTD., Osaka-shi (JP)

( * ) Notice: Subject to any disclaimer, the term of this patent is extended or adjusted under 35 U.S.C. 154(b) by 0 days.

(21) Appl. No.: 16/362,309

(22) Filed: Mar. 22, 2019

(65) Prior Publication Data

US 2019/0293122 A1 Sep. 26, 2019

(30) Foreign Application Priority Data

Mar. 26, 2018 (JP) .................................. 2018-058190
Dec. 17, 2018 (JP) .................................. 2018-235190

(51) Int. Cl.
*F16C 41/00* (2006.01)
*F16C 33/72* (2006.01)
*B60B 27/00* (2006.01)
*G01P 3/44* (2006.01)

(52) U.S. Cl.
CPC ........ *F16C 33/723* (2013.01); *B60B 27/0068* (2013.01); *F16C 41/007* (2013.01); *G01P 3/443* (2013.01); *F16C 2326/02* (2013.01)

(58) Field of Classification Search
CPC .. F16C 41/007; F16C 33/723; F16C 2326/02; G01P 3/443; B60B 27/0068
See application file for complete search history.

(56) References Cited

U.S. PATENT DOCUMENTS

| | | | |
|---|---|---|---|
| 9,259,964 B2 * | 2/2016 | Mock ................. | B60B 27/0068 |
| 10,099,509 B2 * | 10/2018 | Konishi ................. | G01P 3/487 |
| 2008/0031561 A1 * | 2/2008 | Hakata ..................... | B60B 3/16 384/544 |
| 2015/0231922 A1 * | 8/2015 | Kaiser ................... | F16C 33/723 384/479 |
| 2019/0070900 A1 * | 3/2019 | Konishi ................. | B60B 35/02 |

FOREIGN PATENT DOCUMENTS

JP 2016-148422 A 8/2016

* cited by examiner

*Primary Examiner* — Thomas R Hannon
(74) *Attorney, Agent, or Firm* — Kratz, Quintos & Hanson, LLP

(57) ABSTRACT

A protective cover is molded through injection molding of a synthetic resin and includes a disc part, a sensor holder part protruding inward from the disc part, and a protruding part protruding inward from the disc part and being continuous with the sensor holder part. The disc part includes a separation wall which is thinner than other portions of the disc part and separates a magnetic encoder and a magnetic sensor from each other. The protruding part has, at the inward-side face thereof, a gate mark caused by the injection molding. The protruding part is provided with, at the outward-side face thereof, a thickness reduction part extending inward so as to be close to the gate mark.

6 Claims, 10 Drawing Sheets

PROTECTIVE COVER HAVING SENSOR HOLDER PART, BEARING DEVICE INCLUDING THE PROTECTIVE COVER, AND METHOD FOR MANUFACTURING THE PROTECTIVE COVER HAVING THE SENSOR HOLDER PART

BACKGROUND OF THE INVENTION

Field of the Invention

The present invention relates to a cup-shaped protective cover which is mounted to an outer ring of a bearing so as to cover a magnetic encoder, and relates, in particular, to a protective cover having a sensor holder part which holds a magnetic sensor opposed to the magnetic encoder.

Description of the Background Art

In anti-lock brake systems widely used in automobiles for providing efficient and safe braking through prevention of locking of wheels, the rotation speed of each wheel is detected by a rotation speed detection device (wheel speed sensor), the acceleration and the deceleration are calculated by a control device, the vehicle body speed and the slip ratio are estimated, and on the basis of the result, an actuator is driven to control the brake fluid pressure, for example.

Bearing devices each including such a rotation speed detection device provided at a rolling bearing (hub bearing) for supporting a wheel of an automobile are also widely used. In such a bearing device, a magnetic encoder in which N poles and S poles are alternately arranged at regular intervals in the circumferential direction is mounted to an inner ring at one end portion in the axial direction of the bearing, and a protective cover is mounted to an outer ring at the one end portion in the axial direction of the bearing so as to seal the bearing (see Patent Literature 1, for example).

In the case of the protective cover of the invention described in Patent Literature 1, a protective cover (bearing cap 33) formed from a synthetic resin into a capped-cylindrical shape is provided with a sensor holder part (holder support part 50 and nut holding part 51) which protrudes inward from a disc part (bottom plate part 39) and which holds a magnetic sensor for detecting rotation of a magnetic encoder (see Patent Literature 1).

In the state where the protective cover of the invention described in Patent Literature 1 is used, the magnetic sensor is opposed to the magnetic encoder, with a thin separation wall formed integrally with the protective cover interposed therebetween.

When such a protective cover is used, it is not necessary, unlike a protective cover having a sensor mounting hole penetrating a disc part (bottom plate part 12) in the thickness direction thereof (see FIG. 10 of Patent Literature 1, which describes the conventional art), to incorporate a rubber sealing member such as an O-ring between the magnetic sensor and a wall face in which a sensor mounting hole is formed.

Since the bearing device is provided with the protective cover having such a sensor holder part, the one end portion in the axial direction of the bearing is sealed, and thus, pebbles, muddy water, and the like do not collide with the magnetic encoder. Thus, breakage of the magnetic encoder can be prevented. Since no sealing member around the magnetic encoder is required, sliding resistance is reduced, and thus, the running torque of the bearing device can be reduced. In addition, the trouble of adjusting the air gap between the magnetic encoder and the magnetic sensor can be eliminated.

CITATION LIST

Patent Literature

[PTL 1] Japanese Unexamined Patent Application Publication No. 2016-148422

The protective cover having the sensor holder part as in the invention described in Patent Literature 1 has the thin separation wall and is manufactured through injection molding of a synthetic resin.

Since such a protective cover includes a sensor holder part (the holder support part 50 and the nut holding part 51) protruding inward from the disc part (the bottom plate part 39), the gate serving as the injection port for the synthetic resin is set at the inward-side face of a substantially-semi-oblong protruding part (protrusion 59) which is continuous with the sensor holder part and which protrudes inward from the disc part (see paragraph [0032], and FIG. 3 and FIG. 4 of Patent Literature 1, for example).

The separation wall is as thin as about 0.3 to 0.8 mm, for example, and in order to charge a molten synthetic resin material into the separation wall, it is necessary to set the gate close to the separation wall and to increase the injection speed.

In the protective cover having such a thin separation wall in the disc part, the gate may be set at the protruding part continuous with the sensor holder part. In such a situation jetting could occur due to the thick protruding part when the molten synthetic resin material is injected from the gate at a high speed into the open region in the cavity of the injection mold die.

Occurrence of jetting causes formation of a contact point where the resin overlaps due to the meandering flow of the jetting, whereby a small-scale weld is generated.

As a result, the strength of the protective cover having the sensor holder part is reduced, and poor appearance and various internal defects of the protective cover are caused.

SUMMARY OF THE INVENTION

In view of the background described above, an object of the present invention is to prevent occurrence of jetting in injection molding of a protective cover having a thin separation wall in a disc part.

In order to solve the above problem, a protective cover having a sensor holder part according to the present invention is a protective cover having a cup shape, for use in a bearing device, the bearing device including:

a bearing including, on an outer peripheral surface thereof, an inner ring having an inner ring raceway surface; an outer ring, on an inner peripheral surface thereof, having an outer ring raceway surface; and a rolling element rolling between the inner ring raceway surface and the outer ring raceway surface;

a magnetic encoder including N poles and S poles, which are alternately arranged at regular intervals in a circumferential direction, the magnetic encoder being located at an inward-side end portion of the bearing and fixed to the inner ring; and a magnetic sensor being opposed to magnetic poles of the magnetic encoder, for detecting rotation of the magnetic encoder, the protective cover being configured to be mounted to the outer ring so as to seal the inward-side end portion of the bearing, the protective cover including:

a disc part made of a synthetic resin;

a sensor holder part made of the synthetic resin and protruding inward from the disc part; and a protruding part made of the synthetic resin, protruding inward from the disc part to be continuous with the sensor holder part, the protective cover being molded through injection molding of the synthetic resin, the disc part having a separation wall which is thinner than other portions of the disc part and separates the magnetic encoder and the magnetic sensor from each other, the protruding part having, at an inward-side face thereof, a gate mark caused by the injection molding, the protruding part being provided with, at an outward-side face thereof, a thickness reduction part extending inward so as to be close to the gate mark (claim 1).

A thickness T around the gate mark of the protruding part may satisfy $d \leq T \leq 3d$, where a diameter of the gate mark is defined as d (claim 2).

According to these configurations of the protective cover having the sensor holder part, during injection molding of the protective cover having the sensor holder part, even when a molten synthetic resin material is injected at a high speed into the cavity of the injection mold die from the gate at the position of the gate mark, the molten material collides with a columnar part protruding toward the gate so as to provide the thickness reduction part, thereby changing the flowing direction of the molten material to flow along the wall faces of the die. Thus, jetting as in the case where the molten material is injected at a high speed into the open region in the cavity does not occur.

Accordingly, generation of a small-scale weld as a result of formation of a contact point where the resin overlaps due to the meandering flow of jetting is prevented.

Therefore, the strength of the protective cover having the sensor holder part as an injection molded article is not reduced, poor appearance and various internal defects of the protective cover are not caused, and the quality of the protective cover is stabilized.

In addition, since jetting does not occur, the fluidity of the resin is stabilized, and charging of the resin into the thin separation wall is also stabilized. Thus, reduction in air tightness of the separation wall and in strength thereof can be prevented.

A bearing device according to the present invention includes the protective cover having the sensor holder part (claims 3 and 4).

A method for manufacturing a protective cover having a sensor holder part according to the present invention is a method for manufacturing, by use of an injection mold die, a protective cover having a cup shape for use in a bearing device, the bearing device including:

a bearing including, on an outer peripheral surface thereof, an inner ring having an inner ring raceway surface, an outer ring having, on an inner peripheral surface thereof, an outer ring raceway surface, and a rolling element rolling between the inner ring raceway surface and the outer ring raceway surface;

a magnetic encoder including N poles and S poles, which are alternately arranged at regular intervals in a circumferential direction, the magnetic encoder being located at an inward-side end portion of the bearing and fixed to the inner ring; and a magnetic sensor being opposed to magnetic poles of the magnetic encoder, for detecting rotation of the magnetic encoder, the protective cover being configured to be mounted to the outer ring so as to seal the inward-side end portion of the bearing, the protective cover including:

a disc part made of a synthetic resin;

a sensor holder part made of the synthetic resin and protruding inward from the disc part; and a protruding part made of the synthetic resin, protruding inward from the disc part to be continuous with the sensor holder part, the disc part having a separation wall which is thinner than other portions of the disc part and separates the magnetic encoder and the magnetic sensor from each other, the injection mold die being configured to mold the protective cover and including:

a gate located at an inward-side face of the protruding part; and a columnar part protruding toward the gate to provide a thickness reduction part extending inward so as to be close to the gate, at an outward-side face of the protruding part, the method including:

closing the injection mold die, injecting a molten synthetic resin material from the gate into a cavity of the die, and solidifying the material to perform injection molding; and opening the injection mold die and taking out a solidified molded article (claim 5).

In a state where the injection mold die is closed, an interval T between the gate and the columnar part may satisfy $d \leq T \leq 3d$, where a diameter of the gate is defined as d (claim 6).

According to these methods for manufacturing the protective cover having the sensor holder part, even when the molten synthetic resin material is injected at a high speed into the cavity of the injection mold die from the gate provided at the inward-side face of the protruding part, the molten material collides with the columnar part protruding toward the gate, thereby changing the flowing direction of the molten material to flow along the wall faces of the die. Thus, jetting as in the case where the molten material is injected at a high speed into the open region in the cavity does not occur.

Accordingly, generation of a small-scale weld as a result of formation of a contact point where the resin overlaps due to the meandering flow of jetting is prevented.

Therefore, the strength of the protective cover having the sensor holder part as an injection molded article is not reduced, poor appearance and various internal defects of the protective cover are not caused, and the quality of the protective cover is stabilized.

In addition, jetting does not occur. Accordingly, the fluidity of the resin is stabilized, and charging of the resin into the thin separation wall is also stabilized. Thus, reduction in air tightness of the separation wall and in strength thereof can be prevented.

Still further, the injection mold die is provided with the columnar part protruding toward the gate. Accordingly, the molten synthetic resin material easily flows in a uniform manner, and the solidification time of the molded body can be reduced. Thus, the molding cycle can be shortened.

In addition, an undercut such as a recess or a protrusion is provided at the side face of the columnar part of the injection mold die, thereby allowing the molded article to be held in the movable die when the injection mold die is opened. Thus, the molded article can be prevented from remaining in the fixed die.

According to the protective cover having the sensor holder part, the bearing device including the protective cover, and the method for manufacturing the protective cover having the sensor holder part as described above, occurrence of jetting can be prevented in injection molding of the protective cover having the thin separation wall in the disc part. Thus, significant effects are exhibited in which the strength of the protective cover is not reduced, poor appearance and various internal defects of the protective cover are not caused, and the quality of the protective cover is stabilized.

DESCRIPTION OF THE PREFERRED EMBODIMENTS

Next, the present invention will be described in further detail with reference to the embodiment shown in the attached drawings.

Herein, the direction of the rotation axis of a bearing device A is referred to as "axial direction", and the direction orthogonal to the axial direction is referred to as "radial direction".

With respect to a bearing 11 and a protective cover 1, in a state where the protective cover 1 is attached to the bearing 11, the direction parallel to the axial direction and extending from the vehicle body of an automobile toward the wheel side is defined as "outward" (see the arrow C1 in FIG. 1, FIG. 5, FIG. 7, FIG. 8, and FIG. 9A), and the direction opposite thereto is defined as "inward" (see the arrow C2 in FIG. 1, FIG. 5, FIG. 7, FIG. 8, and FIG. 9A).

<Bearing Device>

Figure 1:
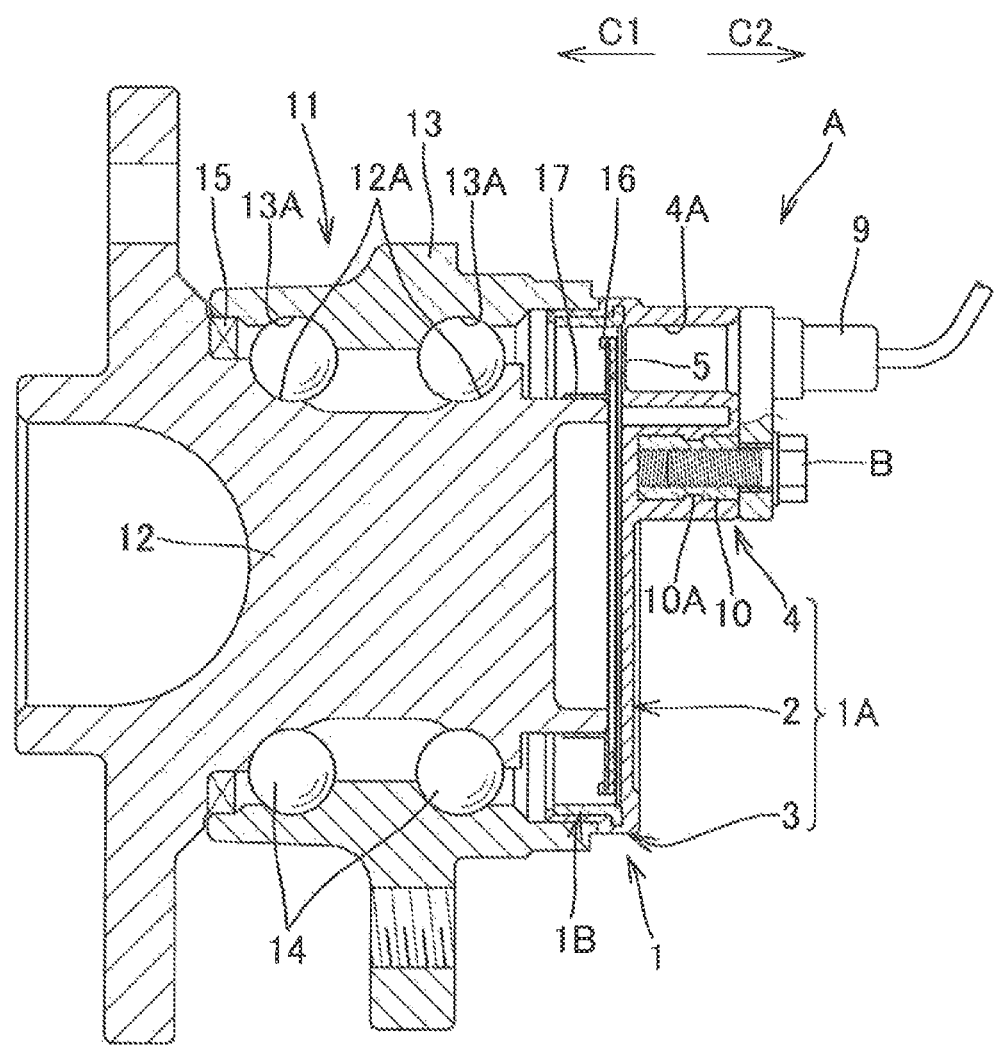
FIG. 1 is a vertical cross-sectional view of a bearing device including a protective cover having a sensor holder part according to an embodiment of the present invention.

As shown in a vertical cross-sectional view in FIG. 1, the bearing device A according to an embodiment of the present invention includes: the bearing 11 in which an inner ring 12 rotates with respect to an outer ring 13; a magnetic encoder 16; the protective cover 1; a magnetic sensor 9; a sealing member 15 disposed at an outward-side (see the arrow C1) end portion of the bearing 11; and so on.

The bearing 11 includes: the inner ring 12 having, on the outer peripheral surface thereof, an inner ring raceway surface 12A; the outer ring 13 having, on the inner peripheral surface thereof, an outer ring raceway surface 13A; rolling elements 14 which roll between the inner ring raceway surface 12A and the outer ring raceway surface 13A; and so on.

The magnetic encoder 16 includes N poles and S poles which are alternately arranged at regular intervals in the circumferential direction. The magnetic encoder 16 is fixed to the inner ring 12 by a support member 17 located at an inward-side (see the arrow C2) end portion of the bearing 11.

The protective cover 1 has a cup shape, is mounted to the outer ring 13 so as to seal the inward-side end portion of the bearing 11, and has a sensor holder part 4 which holds the magnetic sensor 9.

The magnetic sensor 9 attached to the sensor holder part 4 of the protective cover 1 is opposed to the magnetic encoder 16 with a separation wall 5 interposed therebetween, and detects rotation of the magnetic encoder 16.

As seen from the vertical cross-sectional view in FIG. 1, a position of the magnetic encoder 16, which is detected by the magnetic sensor 9, is set to be at a radially outer position, thereby improving the detection accuracy of the rotation speed detection device.

Due to the protective cover 1, the magnetic sensor 9 is opposed to the magnetic encoder 16 with the separation wall 5 interposed therebetween. The protective cover 1 does not have a through hole penetrating the protective cover 1 in the thickness direction thereof. Thus, there is no need to incorporate a sealing member such as an O-ring.

In addition, the inward-side end portion of the bearing 11 is sealed by the protective cover 1, thereby preventing pebbles, muddy water, and the like from colliding with the magnetic encoder 16. This prevents the magnetic encoder 16 from being broken.

Further, the inward-side end portion of the bearing 11 is sealed by the protective cover 1, thereby eliminating the requirement of sealing member at the inward side of the magnetic encoder 16. This reduces the sliding resistance, thereby also reducing the running torque of the bearing 11.

Still further, the protective cover 1 is provided with the sensor holder part 4, thereby eliminating the trouble in adjusting the air gap between the magnetic encoder 16 and the magnetic sensor 9.

<Protective Cover>

Figure 2:
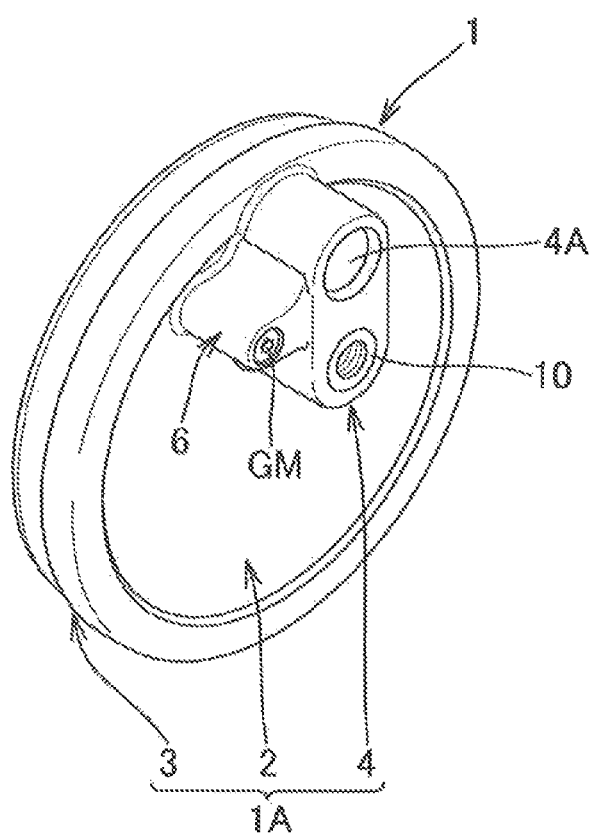
FIG. 2 is a perspective view of the protective cover having the sensor holder part according to the embodiment of the present invention.
Figure 3:
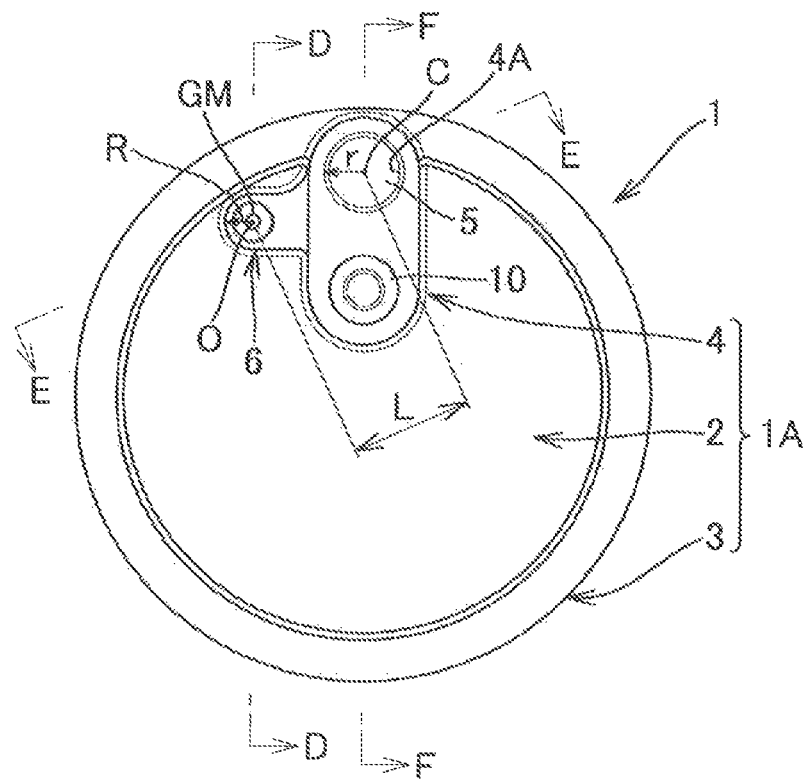
FIG. 3 is a view from the inward side.

As shown in the vertical cross-sectional view in FIG. 1, a perspective view in FIG. 2, and a view from the inward side in FIG. 3, the protective cover 1 according to the embodiment of the present invention includes: a fiber-reinforced synthetic resin main body 1A; and a metal annular body 1B, which are integrally formed through insert injection molding of a resin and a metal.

The fiber-reinforced synthetic resin for molding the main body 1A may include a synthetic resin, such as polyamide (nylon 6, nylon 66, nylon 612, or the like), polyphenylene sulfide (PPS), or polybutylene terephthalate (PBT), and 20 to 70% by weight of glass fiber contained in the synthetic resin, for example. The content of the glass fiber may also be 40 to 60% by weight.

As the metal annular body 1B, a cold-rolled steel such as SPCC, which is a low carbon steel, may be used.

The main body 1A includes: a disc part 2 and a cylindrical part 3 which form a cup shape; the sensor holder part 4 protruding inward from the disc part 2; and a protruding part 6 protruding inward from the disc part 2 and continuous with the sensor holder part 4.

The sensor holder part 4 holds a nut 10 that is, for example, made of brass, and is screwed with a mounting bolt B for mounting the magnetic sensor 9. The sensor holder part 4 has a sensor mounting hole 4A into which the magnetic sensor 9 is inserted.

In the disc part 2, the separation wall 5 thinner than other portions of the disc part 2 is formed. The separation wall 5 separates the magnetic encoder 16 and the magnetic sensor 9 from each other, is formed. A gate mark GM caused by injection molding described later is present at the inward-side face of the protruding part 6.

Figure 4:
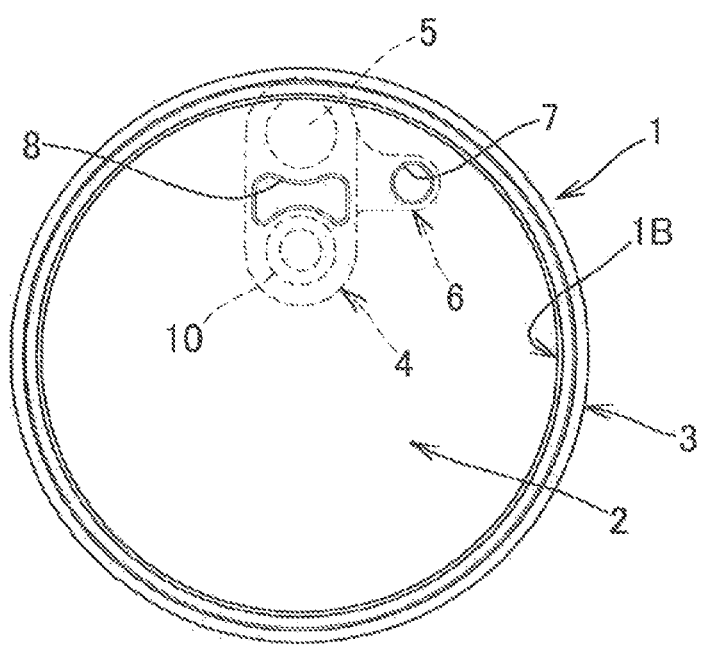
FIG. 4 is a view from the outward side.
Figure 5:
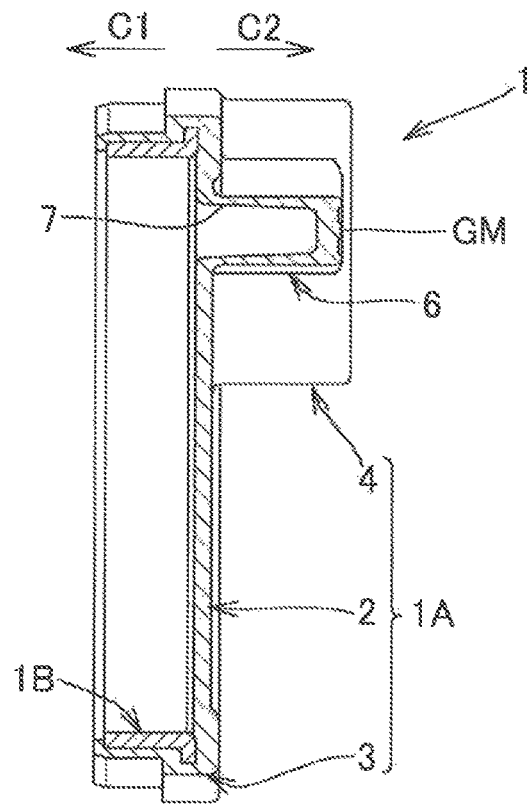
FIG. 5 is a cross-sectional view taken along the arrows D-D in FIG. 3.
Figure 6:
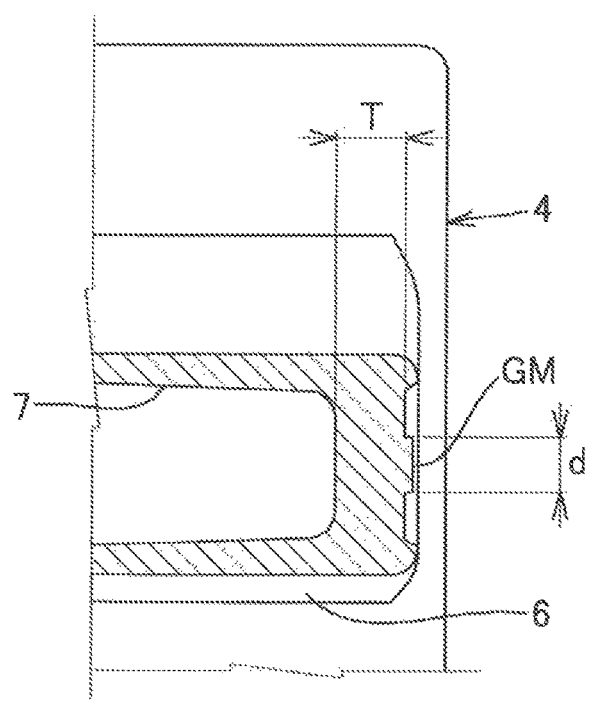
FIG. 6 is an enlarged cross-sectional view of a main part shown in FIG. 5.
Figure 7:
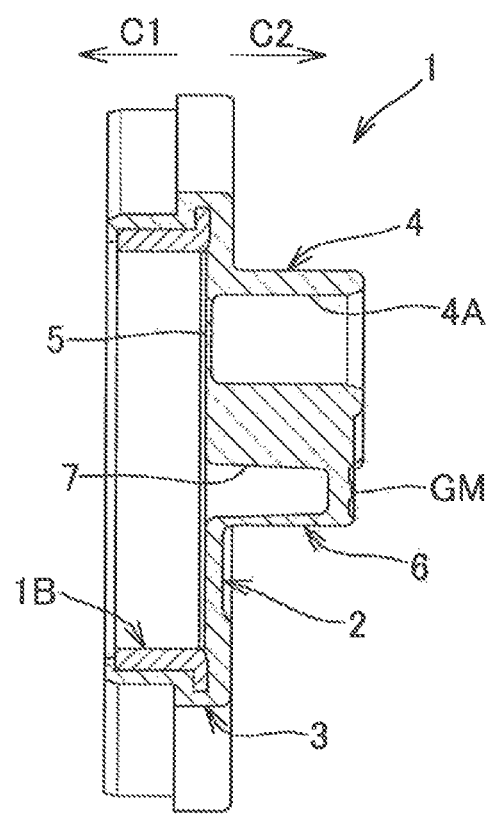
FIG. 7 is a cross-sectional view taken along the arrows E-E in FIG. 3.

As shown in the view from the outward side in FIG. 4, a cross-sectional view in FIG. 5 taken along the arrows D-D in FIG. 3, an enlarged cross-sectional view of a main part in FIG. 6, and a cross-sectional view in FIG. 7 taken along the arrows E-E in FIG. 3, a thickness reduction part 7 extending inward so as to approach the gate mark GM is provided at the outward-side face of the protruding part 6.

As shown in the enlarged cross-sectional view of the main part in FIG. 6, a thickness T around the gate mark GM of the protruding part 6 is set so as to satisfy $d \leq T \leq 3d$, where the diameter of the gate mark GM is defined as d.

Taking the loss at the cutting of the gate into consideration, the thickness T may be not less than the diameter d of the gate (mark). When the thickness T is not greater than $3d$, occurrence of jetting can be prevented.

In addition, as shown in the view from the outward side in FIG. 4, a thickness reduction part 8 extending inward is provided at the outward-side face of the sensor holder part 4, between the separation wall 5 and the nut 10. A thickness reduction part extending outward may be provided at the inward-side face of the sensor holder part 4, between the separation wall 5 and the nut 10.

The thickness reduction part is provided between the separation wall 5 and the nut 10, thereby allowing the thickness of the sensor holder part 4 to be uniform. Thus, a time period required for the solidification of the resin is reduced, and the molding cycle can be shortened. In addition, the molding shrinkage becomes uniform, thereby inhibiting tilting of the sensor holder part 4.

<Method for Manufacturing Protective Cover>

(Injection Mold Die)

Next, a method for manufacturing the protective cover 1 shown in FIG. 2 to FIG. 4 is described with reference to the vertical cross-sectional views of an injection mold die IM mainly shown in FIG. 8 and FIG. 9A.

Figure 8:
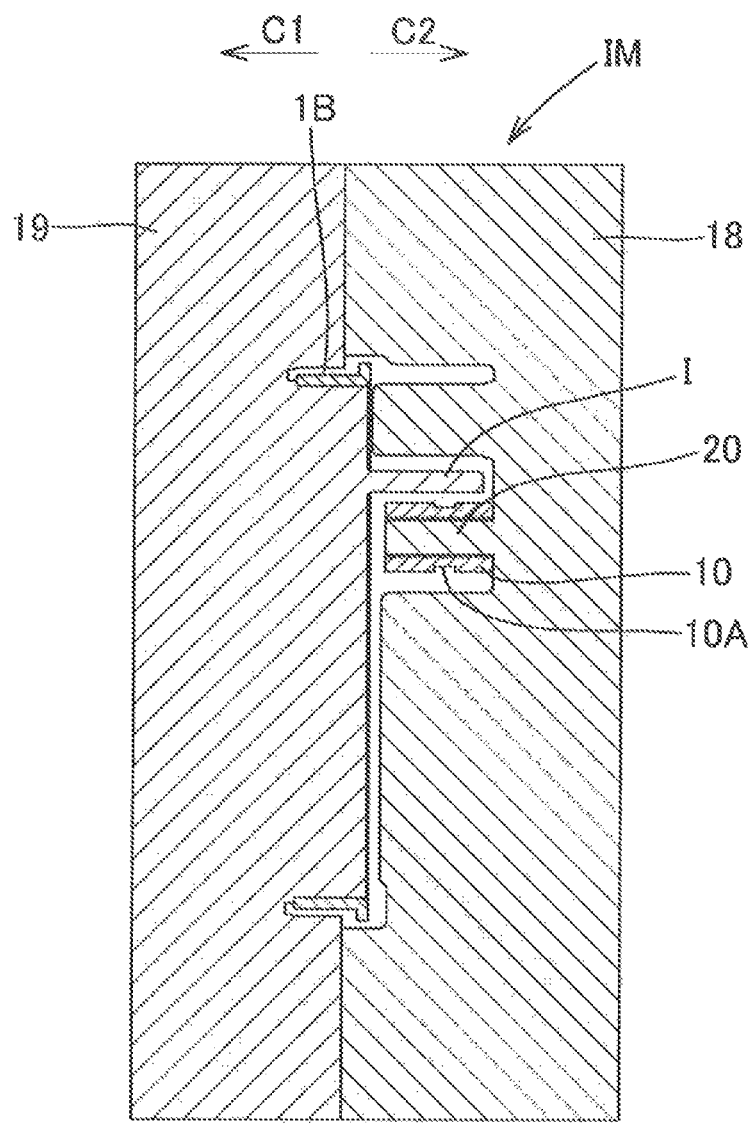
FIG. 8 is a vertical cross-sectional view taken along the arrows F-F in FIG. 3, and shows an injection mold die for molding the protective cover having the sensor holder part according to the embodiment of the present invention.

The vertical cross-sectional view in FIG. 8 corresponds to the cross-section along the arrows F-F in FIG. 3, and shows a state before a molten synthetic resin material P is injected into the cavity of the injection mold die IM.

Figure 9A:
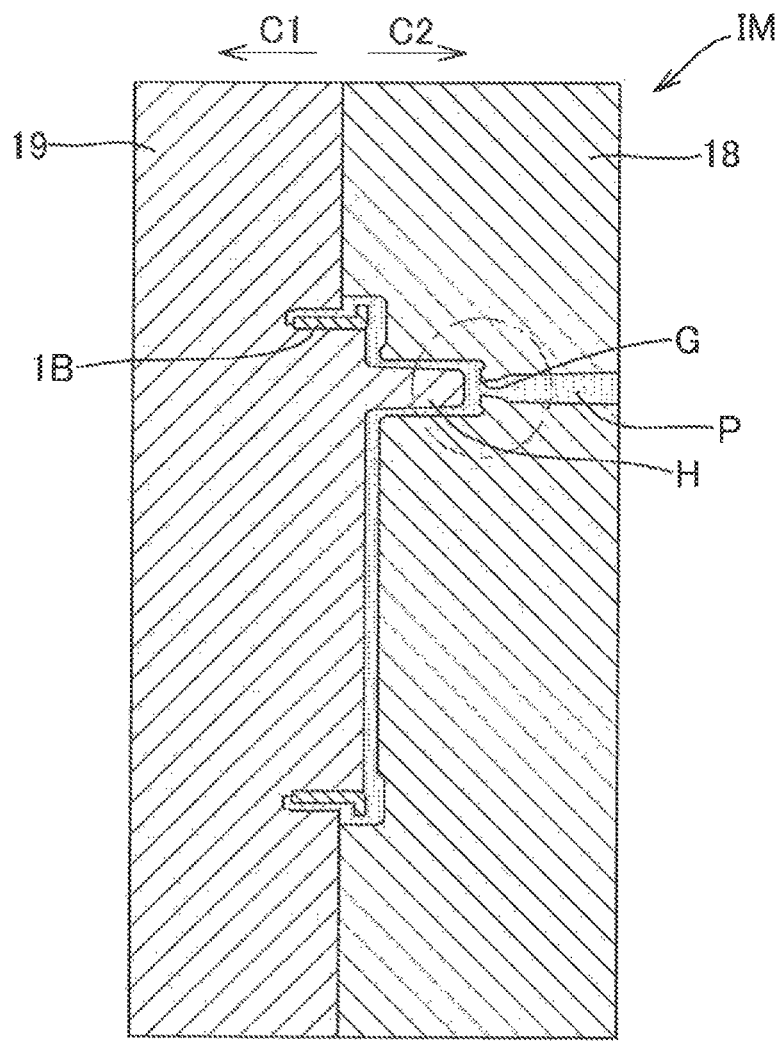
FIG. 9A is a vertical cross-sectional view of the injection mold die, which is taken along the arrows D-D in FIG. 3.
Figure 9B:
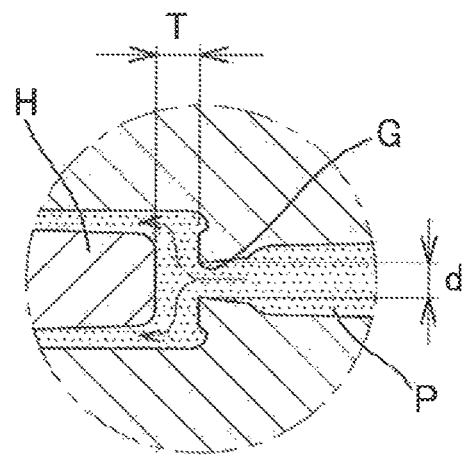
FIG. 9B is an enlarged vertical cross-sectional view of a main part shown in FIG. 9A.

The vertical cross-sectional views in FIG. 9A and FIG. 9B correspond to the cross-section along the arrows D-D in FIG. 3, and shows a state after the molten synthetic resin material P is injected into the cavity of the injection mold die IM.

As shown in FIG. 5 and FIG. 9A, the injection mold die IM includes: a gate G located at the inward-side (see the arrow C2) face of the protruding part 6; and a columnar part H protruding inward toward the gate G such that the thickness reduction part 7 is provided at the outward-side (see the arrow C1) face of the protruding part 6.

In addition, as shown in FIG. 4 and FIG. 8, the injection mold die IM includes a columnar part I protruding inward (see the arrow C2) such that the thickness reduction part 8 extending inward is provided at the outward-side face of the sensor holder part 4.

(Injection Molding Step)

First, as shown in the vertical cross-sectional view in FIG. 8, the nut 10 as an insert article is set to a support shaft 20 of a fixed die 18, the metal annular body 1B as an insert article is set to a movable die 19, and then, the injection mold die IM mounted to the injection molding machine is clamped.

Next, as shown in the vertical cross-sectional view in FIG. 9A, the molten synthetic resin material P is charged from the gate G into the cavity of the injection mold die IM.

Due to the columnar part H of the movable die 19 shown in the vertical cross-sectional view of FIG. 9A, the protective cover 1 as an injection molded article can be provided with the thickness reduction part 7 extending inward so as to be close to the gate G (the gate mark GM), at the outward-side face of the protruding part 6 as shown in the cross-sectional view in FIG. 5.

An interval T between the gate G and the columnar part H in a closed state of the injection mold die IM shown in the enlarged vertical cross-sectional view of the main part in FIG. 9B is set so as to satisfy $d \leq T \leq 3d$, where the diameter of the gate G is defined as d.

A distance L (mm) between a center C of the sensor mounting hole 4A and a center O of the gate G (the gate mark GM) is set so as to satisfy $r+R+3 \leq L \leq r+R+20$, in which an inlet radius r (mm) includes the chamfer portion of the sensor mounting hole 4A, and a radius R (mm) is the radius of the arc portion of the protruding part 6 from the center O. The distance L (mm) is shown in FIG. 3 which is a view of the protective cover 1 from the inward side.

The distance L needs to be not less than (r+R+3) in order to ensure the thickness of the die, and needs to be not greater than (r+R+20) in order to cause the molten synthetic resin material P to appropriately flow in the gap of the die forming the separation wall 5.

Further, the radius R (mm), shown in FIG. 3, from the center O of the arc portion of the protruding part 6 is set so as to satisfy $R \geq 2d$ in order to ensure the strength of the die.

(Molded Article Taking-Out Step)

Next, the molten synthetic resin material P is cooled and solidified, the movable die 19 is opened, and the injection molded article is taken out.

An undercut such as a recess or a protrusion may be provided at the side face of the columnar part H of the movable die 19. Accordingly, when the injection mold die IM is opened, the molded article can be held in the movable die 19, and thus, the molded article can be prevented from remaining in the fixed die 18.

The gate mark GM shown in FIG. 2, for example, remains in the protective cover 1 that is an injection molded article. The "gate mark" of the protective cover 1 includes a mark after the gate mark has been removed through machine work or the like from the protective cover 1 having been taken out of the injection mold die IM.

In the protective cover 1 that is an insert molded article manufactured through the above-described insert injection molding, the synthetic resin enters a peripheral groove 10A of the nut 10, thereby preventing the nut 10 from coming off.

In addition, the cylindrical part 3 is present around the outward-side (see the arrow C1 in FIG. 5 and FIG. 7) end portion of the metal annular body 1B, thereby allowing the metal annular body 1B and the fiber-reinforced synthetic resin main body 1A to be mechanically coupled with each other.

<Modification Having a Thickness Reduction Part Extending Inward so as to be Close to Gate Mark>

Figure 10:
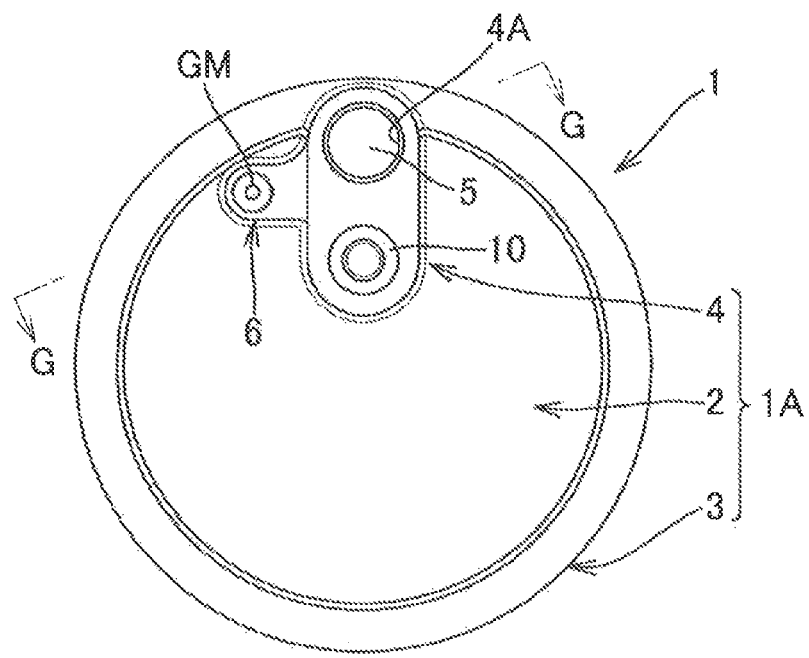
FIG. 10 is a diagram of the protective cover having the sensor holder part seen from the inward side, and shows a modification of a thickness reduction part extending inward so as to be close to a gate mark.
Figure 11:
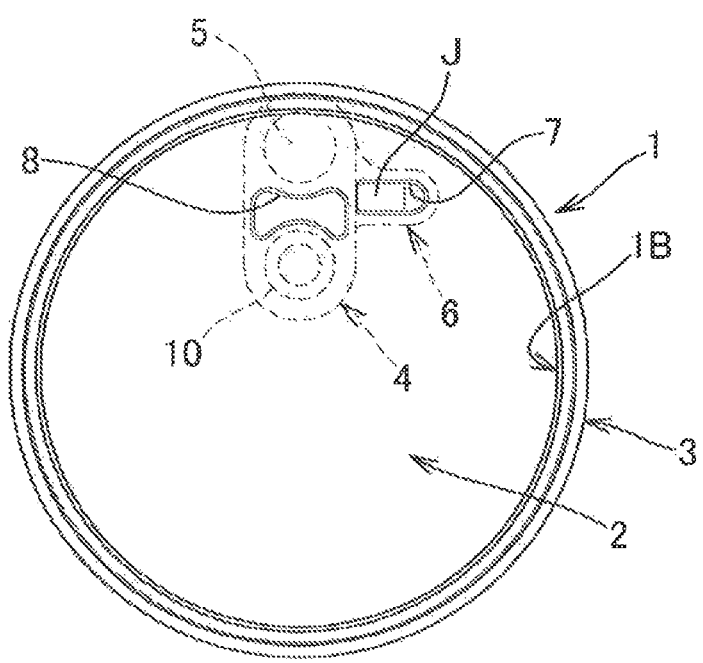
FIG. 11 is a diagram of the protective cover having the sensor holder part seen from the outward side, and shows the modification.
Figure 12:
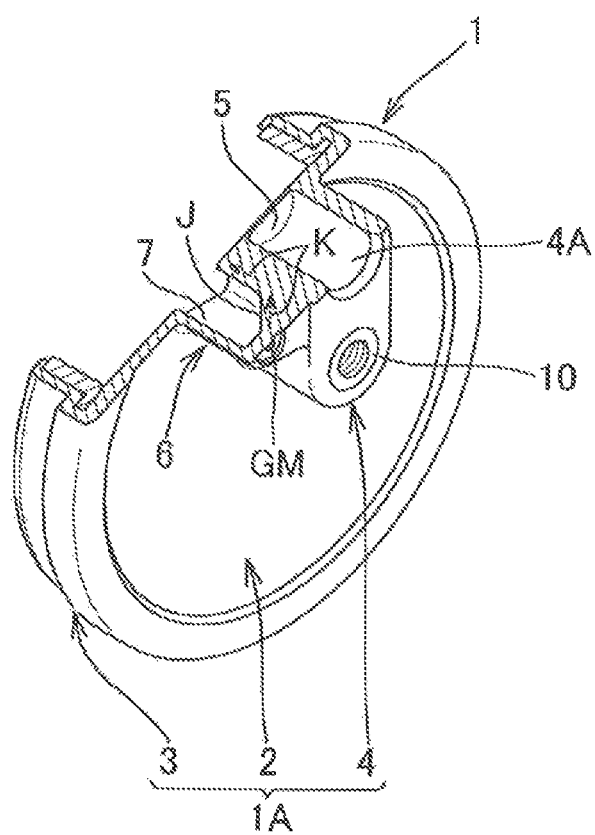
FIG. 12 is a cross-sectional perspective view taken along the arrows G-G in FIG. 10.

The view from the inward side in FIG. 10, the view from the outward side in FIG. 11, and the cross-sectional perspective view in FIG. 12 taken along the arrows G-G in FIG. 10 each show a modification of the thickness reduction part 7 extending inward so as to be close to the gate mark GM.

The thickness reduction part 7 of this modification has an inclined surface J inclined toward the separation wall 5.

Thus, the columnar part H of the movable die 19 in FIG. 9A has a shape for forming the thickness reduction part 7 which is shown in FIG. 11 and FIG. 12, and includes the inclined surface J inclined toward the separation wall 5. That is, the columnar part H has an inclined surface for forming the inclined surface J in the protective cover 1.

Therefore, during injection molding, the molten synthetic resin material P flows, as indicated by the arrow K in FIG. 12, along the inclined surface of the columnar part H of the injection mold die IM. Thus, a channel for causing the molten synthetic resin material P to flow into the vicinity of the separation wall 5 can be formed.

<Modification Having an Annular Recess Provided at the Face Opposed to the Magnetic Encoder>

Figure 13:
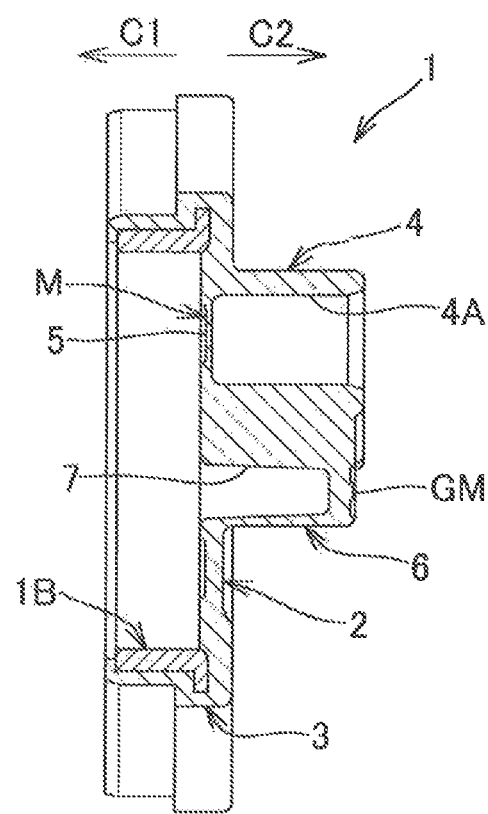
FIG. 13 is a cross-sectional view taken along a line same as in FIG. 7 and shows a modification in which an annular recess is provided in a portion, opposed to a magnetic encoder, of the outward-side face of a disc part.

The protective cover 1 shown in the cross-sectional view of FIG. 13 (cross-sectional view corresponding to FIG. 7) is a modification in which an annular recess M is provided in a portion, opposed to the magnetic encoder 16 (see FIG. 1), of the outward-side (see the arrow C1) face of the disc part 2.

The disc part 2 is set close to the magnetic encoder 16 so as to accommodate the magnetic encoder 16 in the annular recess M. This can reduce the distance between the magnetic encoder 16 and the magnetic sensor 9 which are opposed to each other with the separation wall 5 interposed therebetween. Thus, the output strength of the magnetic sensor 9 can be enhanced.

In addition, the shape of the disc part 2 provided with the annular recess M increases the thickness of other portions excluding the annular recess M, thereby enhancing the rigidity of the protective cover 1.

In a case where the annular recess M is provided to the disc part 2 as in FIG. 13, the corner portions at the outer diameter side and the inner diameter side of the annular recess M may have curved surfaces to remove edges as shown in FIG. 13. Accordingly, abrupt change in the resin channel is prevented, thereby alleviating the residual stress and the stress concentration when thermal shock is received.

The thickness reduction part 7 may be set so as not to interfere with the annular recess M as shown in FIG. 13. This is because, if the thickness reduction part 7 interferes with the annular recess M, stress concentration is caused.

<Effects>

According to the aforementioned method for manufacturing the protective cover 1 having the sensor holder part 4, even if the molten synthetic resin material P is injected at a high speed into the cavity of the injection mold die IM from the gate G provided at the inward-side face of the protruding part 6, the molten material P collides with the columnar part H protruding toward the gate G, and thus, the flowing direction of the molten material P is changed (see FIG. 9B), and the molten material P flows along the wall faces of the die IM. Thus, jetting that may occur when the molten material P is injected at a high speed into the open region in the cavity, does not occur.

Accordingly, a small-scale weld as a result of formation of a contact point where the resin overlaps due to the meandering flow of jetting is prevented from occurring.

Therefore, the strength of the protective cover 1 having the sensor holder part 4 that is an injection molded article is not reduced, poor appearance and various internal defects of the protective cover 1 are not caused, and the quality of the protective cover 1 is stabilized.

In addition, since the injection mold die IM is provided with the columnar parts H, I (see FIG. 9A and FIG. 8), the molten synthetic resin material P easily flows in a uniform manner, and the solidification time of the molded body can be reduced. Thus, the molding cycle can be shortened.

The description of the above embodiment is in all aspects illustrative and not restrictive. Various improvements and modifications can be made without departing from the scope of the present invention.

What is claimed is:

1. A protective cover having a cup shape, for use in a bearing device, the bearing device including:
    a bearing including, on an outer peripheral surface thereof, an inner ring having an inner ring raceway surface; an outer ring, on an inner peripheral surface thereof, having an outer ring raceway surface; and a rolling element rolling between the inner ring raceway surface and the outer ring raceway surface;
    a magnetic encoder including N poles and S poles, which are alternately arranged at regular intervals in a circumferential direction, the magnetic encoder being located at an inward-side end portion of the bearing and fixed to the inner ring; and
    a magnetic sensor being opposed to magnetic poles of the magnetic encoder, for detecting rotation of the magnetic encoder,
    the protective cover being configured to be mounted to the outer ring so as to seal the inward-side end portion of the bearing,
    the protective cover comprising:
        a disc part made of a synthetic resin;
        a sensor holder part made of the synthetic resin and protruding inward from the disc part; and
        a protruding part made of the synthetic resin, protruding inward from the disc part to be continuous with the sensor holder part,
    the protective cover being molded through injection molding of the synthetic resin,
    the disc part having a separation wall which is thinner than other portions of the disc part and separates the magnetic encoder and the magnetic sensor from each other,
    the protruding part having, at an inward-side face thereof, a gate mark caused by the injection molding,
    the protruding part being provided with, at an outward-side face thereof, a thickness reduction part extending inward so as to be close to the gate mark.

2. The protective cover having the sensor holder part according to claim 1, wherein
    a thickness T around the gate mark of the protruding part satisfies $d \leq T \leq 3d$, where a diameter of the gate mark is defined as d.

3. A bearing device comprising the protective cover having the sensor holder part, according to claim 2.

4. A bearing device comprising the protective cover having the sensor holder part, according to claim 1.

5. A method for manufacturing, by use of an injection mold die, a protective cover having a cup shape for use in a bearing device, the bearing device including:
- a bearing including, on an outer peripheral surface thereof, an inner ring having an inner ring raceway surface, an outer ring having, on an inner peripheral surface thereof, an outer ring raceway surface, and a rolling element rolling between the inner ring raceway surface and the outer ring raceway surface;
- a magnetic encoder including N poles and S poles, which are alternately arranged at regular intervals in a circumferential direction, the magnetic encoder being located at an inward-side end portion of the bearing and fixed to the inner ring; and
- a magnetic sensor being opposed to magnetic poles of the magnetic encoder, for detecting rotation of the magnetic encoder, the protective cover being configured to be mounted to the outer ring so as to seal the inward-side end portion of the bearing, the protective cover including:
- a disc part made of a synthetic resin;
- a sensor holder part made of the synthetic resin and protruding inward from the disc part; and
- a protruding part made of the synthetic resin, protruding inward from the disc part to be continuous with the sensor holder part, the disc part having a separation wall which is thinner than other portions of the disc part and separates the magnetic encoder and the magnetic sensor from each other, the injection mold die being configured to mold the protective cover and including:
- a gate located at an inward-side face of the protruding part; and
- a columnar part protruding toward the gate to provide a thickness reduction part extending inward so as to be close to the gate, at an outward-side face of the protruding part, the method comprising:

closing the injection mold die, injecting a molten synthetic resin material from the gate into a cavity of the die, and solidifying the material to perform injection molding; and opening the injection mold die and taking out a solidified molded article.

6. The method for manufacturing the protective cover having the sensor holder part, according to claim 5, wherein
in a state where the injection mold die is closed, an interval T between the gate and the columnar part satisfies $d \leq T \leq 3\,d$, where a diameter of the gate is defined as d.

* * * * *